United States Patent Office 3,445,186
Patented May 20, 1969

3,445,186
ZINC REMOVAL
Kizhakke Govind Hrishikesan, Little Rock, Ark., assignor to Reynolds Metals Company, Richmond, Va., a corporation of Delaware
No Drawing. Filed Dec. 9, 1966, Ser. No. 600,377
Int. Cl. C01f 7/02, 7/34; C01g 3/12
U.S. Cl. 23—141
5 Claims

ABSTRACT OF THE DISCLOSURE

Dissolved zinc is removed from alumina hydrate obtained by the digestion of a zinc-containing aluminous ore with caustic alkali, by forming a slurry of the ore in caustic alkali solution, adding to the slurry at least the stoichometric amount of an alkali metal sulfide to cause precipitation of the zinc as zinc sulfide, the temperature of the digested slurry being no higher than about 220° F., separating alkali insoluble ore residue and a portion of the zinc sulfide to form a digestion liquor, precipitating alumina hydrate from the digestion liquor, and calcining the alumina hydrate at a temperature not less than about 1200° C. to volatilize the remaining zinc sulfide present.

---

This application is related to application Ser. No. 456,817, filed May 18, 1965.

This invention relates to an improved method for the removal of zinc and other metal impurities from alkali metal aluminate solutions. More particularly, the invention concerns the removal of zinc from Bayer process liquors by precipitation with an alkaline metal sulfide.

The novel method of the invention is adapted to the processing of zinc-containing aluminus ores, and particularly ores of the bauxite type. The term "bauxite" is generally used to designate a natural aggregate of aluminum-bearing minerals, more or less impure, in which the aluminum occurs largely as hydrated oxides.

The most commonly used method for extracting alumina from bauxite is the Bayer process. In accordance with this process, the ground bauxite is digested with an aqueous solution of an alkali, such as, for example, caustic soda, or with a mixture of caustic soda and sodium carbonate. There is obtained a slurry which comprises a suspension of the constituents of the bauxite other than alumina and which are insoluble in the alkali liquor. The liquor contains the alumina dissolved in the form of a supersaturated sodium aluminate solution. The constituents of the bauxite which remained unattacked during the alkali digestion form an insoluble residue, known as red mud. For recovery of the alumina, the sodium aluminate solution or Bayer liquor is separated from the red mud by filtration or sedimentation or a combination of both. The clarified liquor comprises an unstable solution of alumina from which most of the dissolved alumina is precipitated by seeding with alumina hydrate. The precipitated alumina hydrate is then separated from the liquor by sedimentation and filtration, washed, and calcined at high temperature to form alumina.

Purity specifications for metallic aluminum currently limit the zinc content to 0.03% or less. In order to meet this specification, it is necessary for the calcined alumina from the Bayer process to contain no more than 0.02% zinc oxide. Correspondingly, the Bayer liquor from which the alumina is produced should have a maximum zinc content of no more than 12 parts per million, or 0.012 gram per kilogram.

Carribean bauxite ores have come into increased use by the American aluminum industry, among which are Jamaican and Haitian bauxites which are relatively high in zinc. Owing to the solubility of zinc oxide in caustic alkalis, a substantial proportion of this zinc finds its way into the Bayer process liquors. Thus, for example, on Bayer digestion of Haitian bauxite at 435° F., the ZnO content of the pregnant liquor was found to be as high as 0.024 g./kg. In another case, on Bayer digestion of a Jamaican bauxite at 460° F., the ZnO content of the pregnant liquor was about 0.019 g./kg. In U.S. Patent 2,885,261, it is proposed to reduce the zinc content of Bayer liquor to a low level by precipitation of zinc sulfide, by the addition of sodium sulfide to the clarified sodium aluminate liquor after removal of the insoluble residues (red mud). The patent indicates that the addition of sodium sulfide to the unclarified digester effluent was less effective for the removal of the zinc.

In accordance with one aspect of the present invention, it has been found, surprisingly and unexpectedly, that a reduction in the zinc content of the clarified Bayer liquor to as little as 10 p.p.m., or 0.010 g./kg. can be successfully achieved by the addition of an alkali metal sulfide to the unclarified bauxite digester slurry and then holding the slurry in a quiescent state for a period of about 15 to about 45 minutes, preferably about 30 minutes. In this way, the red mud, or insoluble bauxite residues, acts as a collector for the precipitated zinc sulfide, greatly facilitating its effective removal.

While not wishing to be bound by any particular theory, it is believed that the problem of zinc removal by utilizing the red mud as a collector is essentially one of collecting of the colloidal zinc sulfide, rather than of the precipitation itself. The colloidal character of precipitated zinc sulfide is well known, and X-ray diffraction studies of precipitated zinc sulfide have shown the presence of extremely small crystallites, of colloidal dimensions. This is confirmed by the finding that the zinc sulfide is capable of being adsorbed by the red mud. Any considerable agitation will cause the zinc sulfide to desorb from the red mud, and an adsorption or growth time after the addition of the precipitant sodium sulfide is needed to promote the formation and collection of the zinc sulfide.

The effectiveness of red mud as a collector for the zinc sulfide is shown by the fact that decantation washing of the settled mud from treated slurry did not cause zinc sulfide to desorb from the mud and return to the liquor, in cases where the proper holding period was employed.

Although zinc reduction can be achieved, in accordance with the invention, by addition of the stoichiometric quantity of alkali metal sulfide, an excess over the stoichiometric quantity is preferred in order to bring about better collection of zinc sulfide on the red mud. Thus, the alkali metal sulfide, such as sodium or potassium sulfide, which is employed as the precipitation agent, is added to the digester slurry in an amount between about 0.14 and about 0.22 g./kg., preferably about 0.18 g./kg.

The temperature of digested slurry after flashing down to atmospheric pressure is about 220° F., and it has been found best to add the sodium sulfide to the digested slurry at a temperature of 220° F. or less. If the digested slurry is much hotter than 220° F. when the Na₂S is added, as would be the case if addition were done in the flash tanks, equivalent zinc removal is obtained only by increasing the dosage level of Na₂S to about 0.36 g./kg.

It is common practice to add starch as a settling agent in the processing of Bayer liquors. In the practice of the present invention, it has been found that more complete removal of zinc is achieved by adding the alkali metal sulfide to the slurry prior to the addition of the starch.

It has been found, in accordance with the invention, that the alkali metal sulfide employed as indicated also aids in the removal of other heavy metals which are capable of forming sulfides insoluble in caustic alkali, such as lead or copper. Thus, a reduction in lead content from 1.5 p.p.m. down to an amount not readily detectable is concurrently achieved.

The treatment of a digester discharge slurry with 0.18 g./kg. of sodium sulfide, in accordance with the invention, can reduce the zinc oxide content of the Bayer liquor from 0.024 to 0.010 g./kg.

In accordance with another aspect of the invention, it has been found that the zinc content can be further reduced, to a level as low as 0.006 g./kg. by passing the liquor through a polishing filter, using as a filter medium a regular red mud filter cake obtained from the conventional clarification of Bayer liquor. This procedure also serves to reduce the holding time for the zinc sulfide precipitation using the red mud as the collector.

In accordance with still another aspect of the invention, it has been found that the step of holding the slurry in a quiescent state for a period of about 15 to 45 minutes can be substantially eliminated by allowing most of the precipitated zinc sulfide to be carried through into the precipitated alumina hydrate. In accordance with this alternative procedure, a stoichiometric quantity, or a slight excess thereover, of an alkali metal sulfide is added to a slurry of the zinc-containing bauxite at any stage prior to alumina hydrate precipitation. This addition point can be at the predigestion step, in the digester blow-off, or to the feed slurry containing alkali insoluble ore residue which is fed to the settler. All the zinc in solution will thus be precipitated as colloidal zinc sulfide. Some of this zinc sulfide will be removed with the red mud during settling and filtration, but a good portion of it will remain in the liquor feed to the alumina hydrate precipitator. During precipitation, most of the colloidal zinc sulfide will be carried into the precipitated alumina hydrate.

The subliming temperature of zinc sulfide is about 1185° C., and when this alumina hydrate containing zinc sulfide is calcined at about 1200° C., the zinc sulfide present will sublime and can be removed and recovered, or else allowed to escape in the off-gas and dust. The resulting alumina will contain less than 0.02% zinc oxide.

In accordance with another aspect of the invention, it has been found that there can be advantageously employed as the alkali metal sulfide precipitant for the zinc, sodium sulfide obtained by the carbothermic reduction of the sodium sulfate content of the "salting out product" (SOP) formed as a by-product in the evaporative processing of Bayer liquor. The salting out product is a mixture of sodium sulfate, sodium carbonate, and sodium aluminate. A typical analysis of SOP shows a composition:

Ingredient: Percent
  Total $Na_2O$ _____ 51.85
  $Na_2CO_3$ _____ 44.84
  NaOH _____ 15.60
  $Al_2O_3$ _____ 8.32
  $SO_3$ _____ 10.21
  Cl _____ 0.65
  $P_2O_5$ _____ 0.017
  F _____ 0.09
  Sodium organic salts as $Na_2CO_3$ _____ 7.10

The $Na_2SO_4$ in the SOP cake is carbothermically reduced to $Na_2S$ to the extent of about 86% by heating a mixture of SOP cake with between about 20% and about 30% by weight of carbon (coke breeze) for a period of about 1 hour, at a temperature between about 1380° F. and about 174° F., preferably about 1560° F.

It was found, surprisingly and unexpectedly, that the reduced SOP cake when slurried in water is about 40% more effective in removing zinc oxide from Bayer liquor than pure sodium sulfide. Thus, by employing pure sodium sulfide in a concentration of 0.18 g./kg. the zinc oxide level in Haitian bauxite digester slurry was reduced to 0.010 g./kg., whereas employing the same concentration of sodium sulfide in the form of reduced salting out product, the zinc oxide level was reduced to 0.006 g./kg., without the benefit of red mud cake filtration. This additional reduction is believed to be attributable to the beneficial presence of undissolved solids in the SOP reduction product.

The following examples illustrate the practice of the invention, but are not to be regarded as limiting:

EXAMPLE 1

Several Bayer digestions were carried out at 435° F. for 30 minutes using Haitian bauxite and caustic soda solution having the following analyses:

Haitian bauxite

|  | Percent |
|---|---|
| $Al_2O_3$ | 45.86 |
| $Fe_2O_3$ | 20.96 |
| $SiO_2$ | 2.22 |
| ZnO | 0.031 |
| Loss on ignition | 23.06 |

Caustic soda solution

|  | Gram/kilogram |
|---|---|
| NaOH as $Na_2CO_3$ | 182.1 |
| $Na_2CO_3$ | 44.1 |
| $Al_2O_3$ | 60.2 |
| ZnO | 0.002 |

The slurries from the above digestions contained 145 g./kg. NaOH as $Na_2CO_3$, 93 g./kg. $Al_2O_3$ and 0.024 g./kg. ZnO.

There was added to the slurries sodium sulfide at various dosage levels. The mixtures were held at 200° F. in quiescent condition for different periods of time. Starch was then added in accordance with conventional practice and the mud was allowed to settle. The supernatant, clarified liquor was then analyzed for ZnO content. In some tests the clarified liquor was filtered through a filter cake of conventional red mud.

The results of these tests are given in the following table:

| Dosage of $Na_2S$, g./kg. | Holding time, min. | ZnO in clarified liquor, g./kg. | ZnO in clarified liquor after filtration through red mud cake, g./kg. |
|---|---|---|---|
| None | 0 | 0.024 | 0.013 |
| 0.09 | 60 | 0.014 | 0.007 |
| 0.18 | 0 | 0.016 | 0.007 |
| 0.18 | 10 | 0.014 | 0.006 |
| 0.18 | 30 | 0.010 |  |
| 0.18 | 60 | 0.010 |  |
| 0.24 | 30 | 0.010 |  |
| 0.36 | 30 | 0.010 |  |

The above results clearly demonstrated that at a $Na_2S$ dosage level of 0.18 g./kg., the ZnO level in the digested liquor was reduced from 0.024 g./kg. to 0.010 g./kg. A further reduction to 0.006 g./kg. ZnO was achieved by filtration of the liquor through a red mud cake.

EXAMPLE 2

A salting out product from Bayer liquor, composed of $Na_2CO_3$, $Na_2SO_4$ and $NaAlO_2$, analyzing 10.21% $SO_3$, was heated with 20% of its weight of coke breeze at 1560° F. for a period of one hour. The reduction of $Na_2SO_4$ to $Na_2S$ was about 86%. The reduced SOP cake was slurried in water to form an aqueous solution of sodium sulfide, the ratio of reduced SOP cake to water being about 46 to 52 parts by weight. 9.4 parts of NaOH were added to stabilize the alumina content to furnish a slurry containing about 2.5% $Na_2S$. This slurry was added to the Haitian bauxite digester slurry obtained in Example 1 in an amount sufficient to furnish a concentration of 0.18 g./kg./$Na_2S$ in the digester slurry. The mixture was held for 30 minutes to allow collection of the precipitated zinc sulfide on the red mud. After settling and clarification, the zinc oxide content of the clarified liquor was found to be 0.006 g./kg. Under these conditions further filtration through a red mud cake as described in Example 1 was not necessary. By filtering the clarified liquor through a cake of red mud, however, the ZnO level in the liquor was further reduced to 0.004 g./kg.

EXAMPLE 3

Proceeding as in Example 1, sodium sulfide was added to bauxite slurries and the red mud was removed by settling and filtration in accordance with conventional procedure. Thereafter alumina hydrate was precipitated from the clarified liquor and calcined at a temperature of 1200° C. The resulting alumina contained 0.018% zinc oxide.

While presently preferred practices of the invention have been described, it will be apparent that the invention may be otherwise variously embodied and practiced within the scope of the following claims.

What is claimed is:

1. Method for the removal of zinc from alumina hydrate obtained by the digestion of a zinc-containing aluminous ore with caustic alkali, comprising the steps of forming a slurry of said ore with a caustic alkali solution, adding to said slurry at least the stoichoimetric amount of an alkali metal sulfide to cause precipitation of the zinc sulfide, the temperature of the digested slurry being no higher than about 220° F., separating alkali insoluble ore residue and a portion of the zinc sulfide from said slurry to form a digestion liquor, precipitating alumina hydrate from said digestion liquor, and calcining said alumina hydrate at a temperature not less than about 1200° C. to volatilize the residual zinc sulfide present 2. The method of claim 1 in which the alkali metal sulfide is sodium sulfide.

3. The method of claim 1 in which the aluminous ore is a zinc-containing bauxite.

4. The method of claim 1 in which said alkali metal sulfide is produced by carbothermic reduction of a mixture of sodium sulfate, sodium carbonate and sodium aluminate formed as a by-product in the processing of sodium aluminate solutions to recover alumina therefrom.

5. The method of claim 4 in which the carbothermic reduction is performed by heating said by-product with from about 20% to about 30% by weight of carbon at from about 1380° to about 1740° F.

References Cited

UNITED STATES PATENTS

| | | | |
|---|---|---|---|
| 1,262,062 | 4/1918 | Lawrie | 23—143 |
| 2,885,261 | 5/1959 | Adams et al. | 23—143 |

HERBERT T. CARTER, *Primary Examiner.*

U.S. Cl. X.R.

23—143, 135